United States Patent [19]
Maeng et al.

[11] Patent Number: 5,991,277
[45] Date of Patent: Nov. 23, 1999

[54] PRIMARY TRANSMISSION SITE SWITCHING IN A MULTIPOINT VIDEOCONFERENCE ENVIRONMENT BASED ON HUMAN VOICE

[75] Inventors: Joon Maeng, Austin; Paul V. Tischler, Round Rock; Bill Clements, Austin, all of Tex.

[73] Assignee: Vtel Corporation, Austin, Tex.

[21] Appl. No.: 09/057,849

[22] Filed: Apr. 9, 1998

Related U.S. Application Data

[63] Continuation of application No. 08/546,276, Oct. 20, 1995, Pat. No. 5,768,263.

[51] Int. Cl.⁶ .................................................. H04L 12/16
[52] U.S. Cl. .................................... 370/263; 379/202
[58] Field of Search .................................. 370/263, 210, 370/433, 435, 260, 264, 266, 270, 465; 379/157, 158, 202, 388–390

[56] References Cited

U.S. PATENT DOCUMENTS

| | | | |
|---|---|---|---|
| 3,601,530 | 8/1971 | Edson et al. | 178/5.6 |
| 3,944,736 | 3/1976 | Shepard | 178/6.8 |
| 4,054,908 | 10/1977 | Poirier et al. | 358/85 |
| 4,531,024 | 7/1985 | Colton et al. | 179/2 TS |
| 4,716,585 | 12/1987 | Tompkins et al. | 379/202 |
| 5,206,721 | 4/1993 | Ashida et al. | 358/85 |
| 5,430,826 | 7/1995 | Webster et al. | 395/2 |
| 5,563,952 | 10/1996 | Mercer | 381/56 |
| 5,596,680 | 1/1997 | Chow et al. | 395/257 |
| 5,610,920 | 3/1997 | Doll et al. | 370/260 |
| 5,611,019 | 3/1997 | Nakatoh et al. | 395/2.42 |
| 5,768,263 | 6/1998 | Tischer et al. | 370/263 |

OTHER PUBLICATIONS

A. Michael Noll, "Cepstrum Pitch Determination," Bell Telephone Laboratories, Murray Hill, New Jersey, pp. 179–195, reprinted from J. Acoust. Soc. Am., vol. 41, Feb. 1967.

Richard C. Dorf, editor, *The Electrical Engineering Handbook*, CRC Press, Inc., Boca Raton, Florida, 1993, pp. 303–304.

Wolfgang Hess, *Pitch Determination of Speech Signals*, Springer–Verlag, Apr. 1983, pp. 396–409.

L. R. Rabiner and R. W. Schafer, *Digital Processing of Speech Signals*, Prentice Hall, Englewood Cliffs, N.J., Jun. 1978, pp. 355–395.

Joe Duran and Charlie Sauer, *Mainstream Videoconferencing: A Developer's Guide to Distance Multimedia*, Addison Wesley Pub. Co., Apr. 1997, pp. 73–74 and 192–193.

Toby Trowt–Bayard, *Videoconferencing: The Whole Picture*, Flatiron Publishing, Inc., New York, N.Y., Apr. 1994, pp. 207–209, 239–241 and 438.

*Primary Examiner*—Chi H. Pham
*Assistant Examiner*—Maikhanh Tran
*Attorney, Agent, or Firm*—Skjerven, Morrill, MacPherson, Franklin & Friel LLP; Stephen A. Terrile; Michael P. Noonan

[57] ABSTRACT

A method for determining a talk/listen state using voice detection includes receiving an audio sample and detecting whether the audio sample includes voiced sound. The audio sample represents sound measured during a sample time interval. The method further includes deriving an audio level from the audio sample and comparing the audio level to a threshold level. The audio level represents an average power level of the audio sample. The method further includes determining the talk/listen state depending on a relation of the audio level to the threshold level and depending on whether the audio sample includes voiced sound.

37 Claims, 13 Drawing Sheets

PRIMARY TRANSMISSION SITE SWITCHING IN A MULTIPOINT VIDEOCONFERENCE ENVIRONMENT BASED ON HUMAN VOICE

CROSS-REFERENCE TO RELATED APPLICATION

This application is a continuation-in-part of co-pending application, Ser. No. 08/546,276, filed on Oct. 20, 1995, entitled "Method for Talk/Listen Determination and Multipoint Conferencing System Using Such Method", naming Paul V. Tischler and Bill Clements as inventors, and which is incorporated herein by reference.

BACKGROUND

1. Field of the Invention

The present invention relates to multipoint conference systems, and, more particularly, to a method for selecting and switching the primary transmission site in a multipoint conference system based on voiced audio level.

2. Description of the Related Art

A multipoint conference environment typically includes a plurality of conference sites which are geographically separated but electronically linked together to enhance collaboration between and among individuals at the various conference sites. A multipoint conference system attempts to replicate the interpersonal communication and information sharing which would occur if all the participants were together in the same room at the same time. Such a multipoint conference system typically processes conference information (e.g., audio, video and/or data information) communicated between the conference sites during a multipoint conference. With respect to the audio signals, the multipoint conference system can analyze audio signals received from conference equipment located at the conference sites to determine whether the sites are in a "talking" or "listening" state (e.g., whether a speaker at one site is attempting to communicate information to other sites or whether the participants at the one site are listening for communication from the other sites). Specifically, when a multipoint videoconference system determines that a unique site is in a "talking" state, that site becomes the video source for the remaining conference sites.

As used herein, the site that is selected to be the video source for the remaining conference sites is called the primary transmission site. Although other sites may be transmitting video information, the video information transmitted from the primary transmission site is viewed at other sites. A multipoint videoconference system may display simultaneous views of multiple sites on a screen while identifying a "talking" site to manage the screen views. The selection of a primary transmission site from among a plurality of conference sites is called switching. The automatic selection of a primary transmission site according to audio levels received from the plurality of conference sites is referred to herein as sound-activated switching.

Because the microphones of conventional multipoint conference systems do not discriminate human voice from other sounds, the primary transmission site is typically selected based on the amplitude of sound detected by the microphones without regard to the type of sound detected by the microphones. Although much of the prior art uses the term "talking" and often refers to "voice-activated" switching, the terms "talking" and "voice" in the prior art typically refer to detected sound level at a particular input device without regard to whether the sound is actually talking or is in reality background noise.

For example, conventional multipoint conference systems determine talk and listen states depending on the sound level received from each station. Thus, although the selection of a primary transmission site according to such a "talk/listen" determination is often referred to as "voice-activated" switching in the prior art, such switching may be more accurately described as sound-activated switching according to a loud/quiet determination. Sound-activated switching provides a useful but limited approximation of actual voice-activated switching.

Another limited approximation to actual voice-activated switching is the use of a circuit or method to prevent a short duration audio signal above a certain threshold from switching the primary transmission site from the site of the speaker to the site of the short duration audio signal (e.g., a cough delay). Again, although such a circuit or method may be referred to as voice-activated switching, such a circuit is really a limited approximation of the behavior of an actual voice-activated switching method. Such a circuit or method is limited in that relatively long term but non-voiced sounds may switch the primary transmission site to an incorrect conference site. Furthermore, legitimate video switching may be delayed by such a circuit or method.

The audio signals received by a control unit of a multipoint conference system can vary greatly in volume and ambient noise depending on, for example, the conference room, conference equipment and/or audio compression algorithms used. Also, background noises such as computer keystrokes, the rustling of papers, the sounds of eating during a lunch conference, coughing, sneezing, and/or the opening and closing of doors often trigger a switch of the primary transmission site from the site of the speaker to the site of the background noises. Air conditioner fan noises and/or other continuous machine noises can also cause erroneous switching of the transmission site. When background noises are coupled with variations in speaker volume, the effectiveness of a multipoint conference system using sound-activated switching can be substantially degraded.

SUMMARY

It has been discovered that human voice detection may be incorporated into a multipoint conference system to provide a more accurate determination of whether a conference site is a talking site or a listen site. Such a configuration provides the advantage that the primary transmission site is more accurately selected. The primary transmission site is selected based at least upon actual detection of a human voice or voices. The human voices of the conference participants are distinguished from unvoiced sounds transmitted from various conference sites. The degradation in the ability to select a primary transmission site due to the presence of unvoiced sound is thereby lessened. The human voice detection may be implemented in each conference unit at each conference site or in a conference control unit of a multipoint conference system to select the primary transmission site based on the loudest human voice as compared to a continuously updated dynamic threshold level.

In one embodiment of the invention, a method for determining a talk/listen state using voice detection is provided. The method includes receiving an audio sample and detecting whether the audio sample includes voiced sound. The audio sample represents sound measured during a sample time interval. The method further includes deriving an audio level from the audio sample and comparing the audio level to a threshold level. The audio level represents an average power level of the audio sample. The method further includes determining the talk/listen state depending on a relation of the audio level to the threshold level and depending on whether the audio sample includes voiced sound. In a further embodiment, the method includes determining the talk/listen state to be a listening state if the audio level is below the threshold level or if the audio sample does not include voiced sound, and determining the talk/listen state to be a talking state if the audio level is above the threshold level and the audio sample includes voiced sound.

In another embodiment of the invention, an apparatus includes a voice detection unit and a talk/listen determination unit. The voice detection unit detects whether an audio signal includes voiced sound responsive to receiving the audio signal. The talk/listen determination unit derives an average audio power level of the audio signal and derives a dynamic threshold level based on the average audio power level and past average audio power levels responsive to receiving the audio signal. The talk/listen determination unit determines a talk/listen state depending on a comparison of the average audio power level and the dynamic threshold level and on whether the voice detection unit detects voiced sound.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following description is intended to be illustrative of the invention and should not be taken to be limiting. Rather, any number of variations may fall within the scope of the invention which is defined in the claims following the description.

Figure 1:
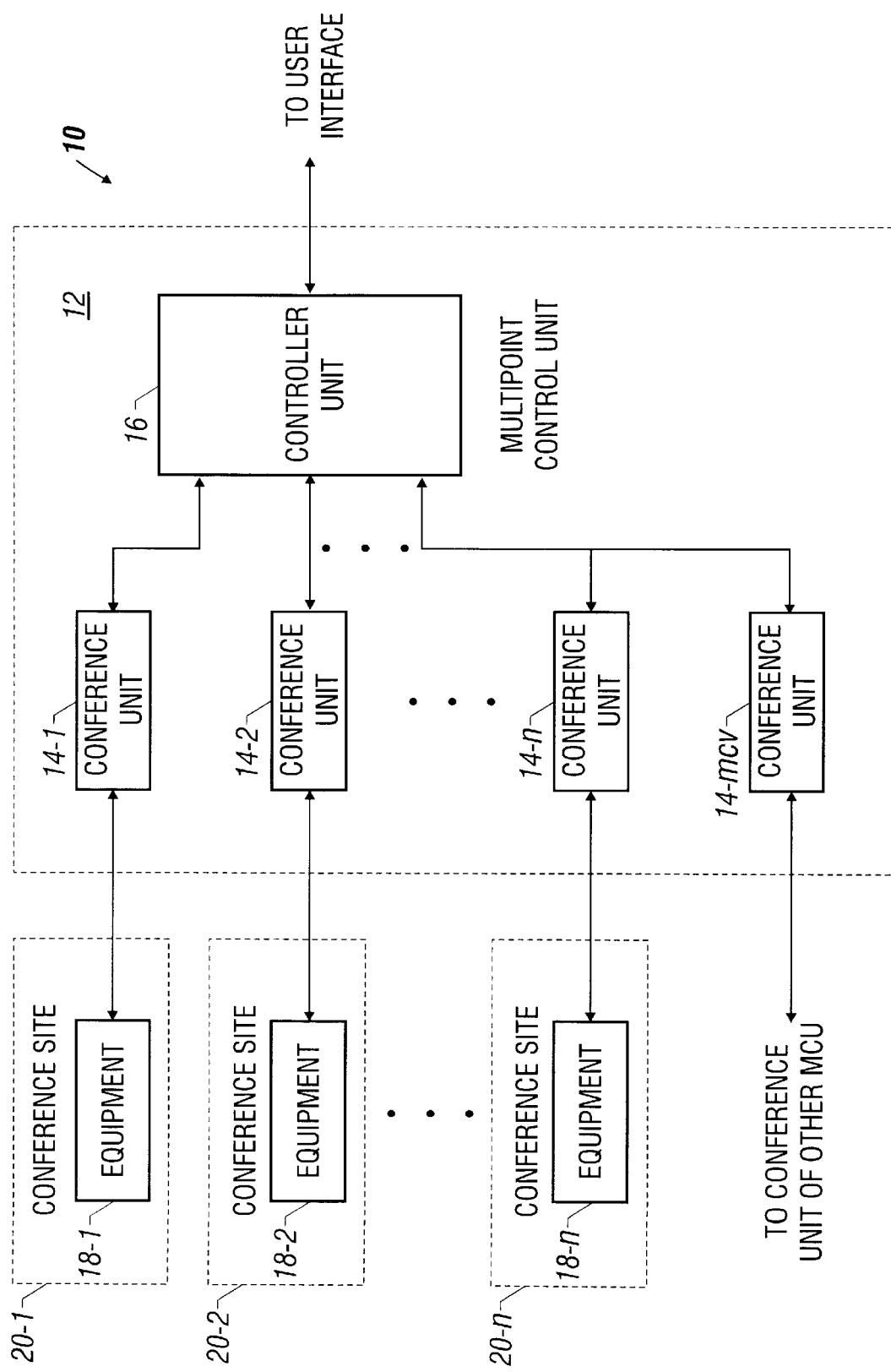
FIG. 1 shows a block diagram of one embodiment of a multipoint conference system according to the invention.

FIG. 1 is a block diagram of one embodiment of a multipoint conference system, indicated generally at 10. System 10 includes a multipoint control unit 12 that includes a plurality of conference units 14-1, 14-2 . . . 14-n and 14-MCU, generally referred to as conference units 14, coupled to a controller unit 16. Controller unit 16 is coupled to another controller unit via conference unit 14-MCU as shown. Controller unit 16 can also communicate with a user through a user interface. Each conference unit 14 is coupled to a corresponding one of a plurality of sets of conference equipment 18-1, 18-2 . . . 18-n, generally referred to as conference equipment 18. Each set of conference equipment 18 is located at a plurality of conference sites 20-1, 20-2 . . . 20-n, generally referred to as conference sites 20. Each conference equipment 18 includes input-output devices for audio, video and data information transmission and reception.

In operation, system 10 provides a multipoint conference environment for users located at each conference site 20. Each conference equipment 18 located at a conference site 20 communicates conference information (e.g., audio, video and/or data information) to users at conference site 20. For example, conference equipment 18 includes a video monitor and speakers for communicating such information to the users at conference site 20. Each conference equipment 18 is coupled to a conference unit 14 in order to communicate conference information to other conference sites 20. For example, conference equipment 18 includes a camera and microphones for communicating video and audio information from a local conference site 20 to remote conference sites 20. Additionally, some or all of conference equipment 18 include one or more information processing terminals (e.g., personal computers) for generating data information such as computer graphics or user generated slide annotations. Each conference unit 14 operates to receive information from and transfer information to associated conference equipment 18 and to other conference units 14 via controller unit 16.

Controller unit 16 operates to control the multipoint conference system including switching video, audio and data information that is transmitted to each of conference units 14 to create and maintain a multipoint conference between conference sites 20. One of the functions that is performed by controller unit 16 is voice-activated video switching between conference sites 20. Each conference unit 14 notifies controller unit 16 as to whether the associated conference site 20 is in a talking state or listening state. Controller unit 16 then uses this talk/listen determination in order to switch video between conference sites 20. As will be described hereinafter, the talk/listen determination includes a determination that audio being transmitted by a site is voiced or unvoiced in addition to other factors such as a sound level compared to a variable threshold level.

Figure 2:
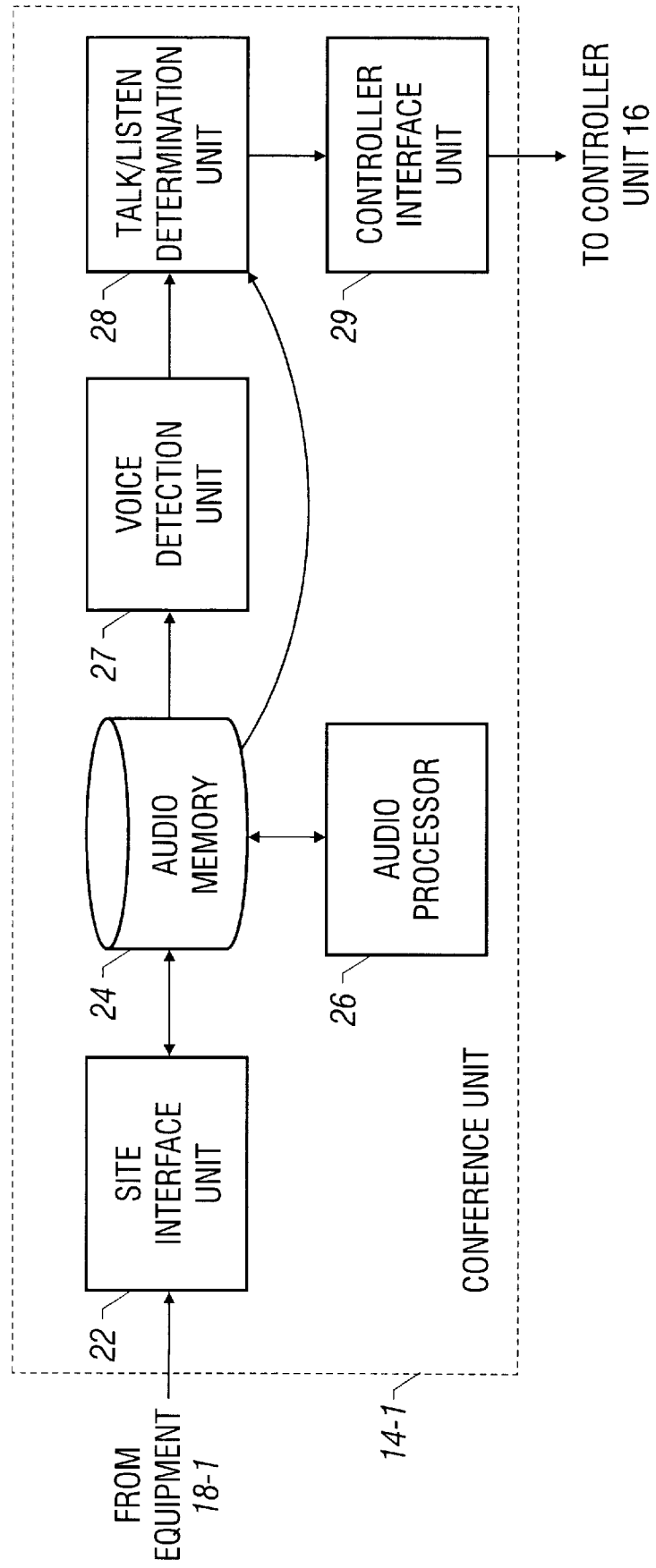
FIG. 2 shows a block diagram of one embodiment of a conference unit of the multipoint conference system of FIG. 1.

FIG. 2 is a block diagram of one embodiment of a conference unit 14 of multipoint control unit 12 of FIG. 1. Conference unit includes site interface unit 22, audio memory 24, audio processor 26, voice detection unit 27, talk/listen determination unit 28 and controller interface unit 29. Site interface unit 22 is coupled to conference equipment 18 and audio memory 24. Audio processor 26 is coupled to audio memory 24. Voice detection unit is coupled to audio memory 24 and talk/listen determination unit 28. Controller interface is coupled to talk/listen determination unit 28 and to controller unit 16.

Site interface unit 22 communicates with conference equipment 18 by receiving and transmitting the audio, video and data information. With respect to audio information, site interface unit 22 provides compressed audio samples to audio memory 24. In one embodiment, the compressed audio samples include packets of audio data representing 20 milliseconds of sound measured from the conference site. The audio samples can be compressed according to conventional data compression algorithms.

Audio memory 24 stores the compressed audio samples received from conference equipment 18 as well as compressed audio samples to be accessed by site interface unit 22 for transmission to conference equipment 18. Audio memory 24 also stores expanded audio samples received from audio processor 26. Audio memory 24 can include any electronic and/or magnetic storage device.

Audio processor 26 is coupled to audio memory 24 and accesses both compressed and expanded audio samples. Audio processor 26 compresses audio samples received by audio memory 24 for subsequent transmission to site interface unit 22. Audio processor 26 decompresses audio samples received by audio memory 24 from site interface unit 22 for subsequent transmission to talk/listen determination unit 28.

Voice detection unit 27 receives expanded audio samples from audio memory 24. Voice detection unit 27 determines if a set of the expanded audio samples includes one or more human voices by analyzing the cepstrum of the audio set (described hereinafter). Once the type of the incoming signals is determined, voice detection unit 27 provides audio type information to talk/listen determination unit 28. For example, voice detection unit 27 sends a voiced/unvoiced sound type determination (e.g., a voice flag) to talk/listen determination unit 28.

Talk/listen determination unit 28 is coupled to voice detection unit 27 and audio memory 24. Talk/listen determination unit 28 receives audio type information from voice detection unit 27 and expanded audio samples from audio memory 24. Talk/listen determination unit 28 processes the expanded audio samples and the audio type information, and provides a talk/listen notification signal to controller interface 29. The talk/listen notification signal indicates whether the associated conference site 20 is in a talk state or listen state. If the associated conference site 20 is in a talk state, the associated conference site 20 is a candidate to be selected by controller unit 16 as the primary transmission site. Controller interface 29 is coupled to controller unit 16 and provides controller unit 16 with talk/listen notification.

Figure 3:
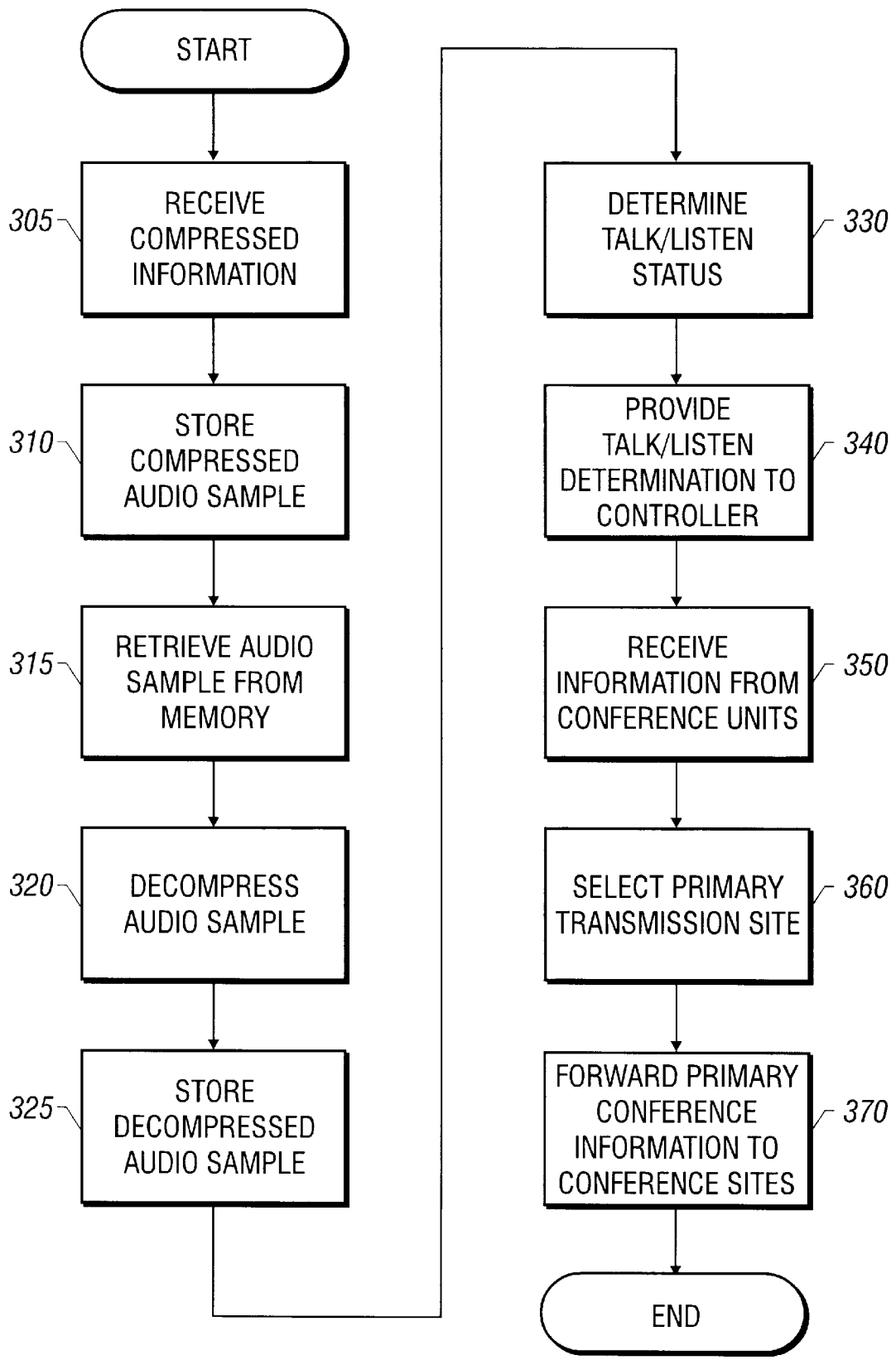
FIG. 3 shows a flow chart of one embodiment of the operation of the multipoint conference system of FIG. 1.

The operation of multipoint conference system 10 of FIGS. 1 and 2 will now be described with reference to FIG. 3. At receive compressed information operation 305, site interface unit 22 of conference unit 14 receives conference information (typically including compressed audio, video and/or data information) from conference equipment 18 located in an associated conference site 20. During store compressed audio sample operation 310, site interface unit 22 stores compressed audio samples of the audio information of the received conference information in audio memory 24. Once stored in audio memory 24, each of the compressed audio samples are accessed by audio processor 26 during retrieve audio sample from memory operation 315. During decompress audio sample operation 320, audio processor 26 expands each of the audio samples according to an appropriate data decompression algorithm that corresponds to the compression algorithm used by conference equipment 18. After expansion and during store decompressed audio sample operation 325, each of the audio samples are again stored in audio memory 24.

During determine talk/listen status operation 330, voice detection unit 27 performs a voice analysis (e.g., a cepstral analysis described hereinafter) on a set of samples (e.g., a set of 20ms audio samples) to determine if the set of audio samples includes voiced speech. Talk/listen determination unit 28 receives the expanded audio samples and the determination of voiced or unvoiced speech, and processes the samples and the voice flag to determine whether the associated conference site 20 is talking or listening. The talk/listen determination unit 28 uses the audio samples to calculate and maintain a dynamic threshold level to which to compare each audio sample. The dynamic threshold level is based upon the audio samples received from conference equipment 18, thus the dynamic threshold level automatically adapts to the specific characteristics of conference site 20. The voice and talk/listen determinations are further described hereinafter with reference to FIGS. 4 et seq. During provide talk/listen determination operation 340, the talk/listen determination unit 28 provides a talk/listen notification signal to controller interface unit 29 for subsequent transmission to control unit 16.

During receive information from conference units operation 350, controller 16 receives a talk/listen notification signal from each of conference units 14 via respective controller interface units 29. During select primary transmission site operation 360, controller 16 selects a primary transmission site according to the talk/listen notification signals.

During forward primary conference information operation 370, controller 16 transmits the primary conference information to each of conference units 14 for retransmission to conference equipment 18 located in associated conference sites 20. Specifically, in each case, site interface unit 22 operates to transmit compressed audio samples from audio memory 24 to conference equipment 18 for presentation to users at conference site 20. At conference site 20, conference equipment 18 expands each of the compressed audio samples according to an appropriate data decompression algorithm that corresponds to the compression algorithm used by audio processor 26.

In one embodiment of the present invention, talk/listen determination unit 28 processes audio data packets representing sound information measured from conference site 20 during an approximately twenty millisecond time period. Each compressed audio data packet corresponds to approximately twenty milliseconds and is processed within that time frame. According to the teachings of the present invention, talk/listen determination uses a dynamic threshold level determined and maintained based upon the expanded audio data packets to determine whether conference site 20 is talking of listening.

In one embodiment of the present invention, multipoint control unit 12 is operable to use the dynamic threshold level for talk/listen determination for each approximately twenty millisecond time period. In this embodiment, talk/listen determination unit 28 uses an average audio power level for each audio data packet to maintain dynamic audio levels from which the dynamic threshold level is determined. In this embodiment, talk/listen determination unit 28 maintains audio levels including a foreground level, background level, and long term background level.

A technical advantage of the present invention is the use of human voice detection along with the determination and use of a dynamic threshold level with respect to each conference site based on audio signals received from that site for use in determining whether the site is talking or listening. This is especially advantageous in the cascade case where the received audio signal is a mix of multiple conference sites received from a multipoint control unit and includes noise from the associated conference sites.

Figure 4A:
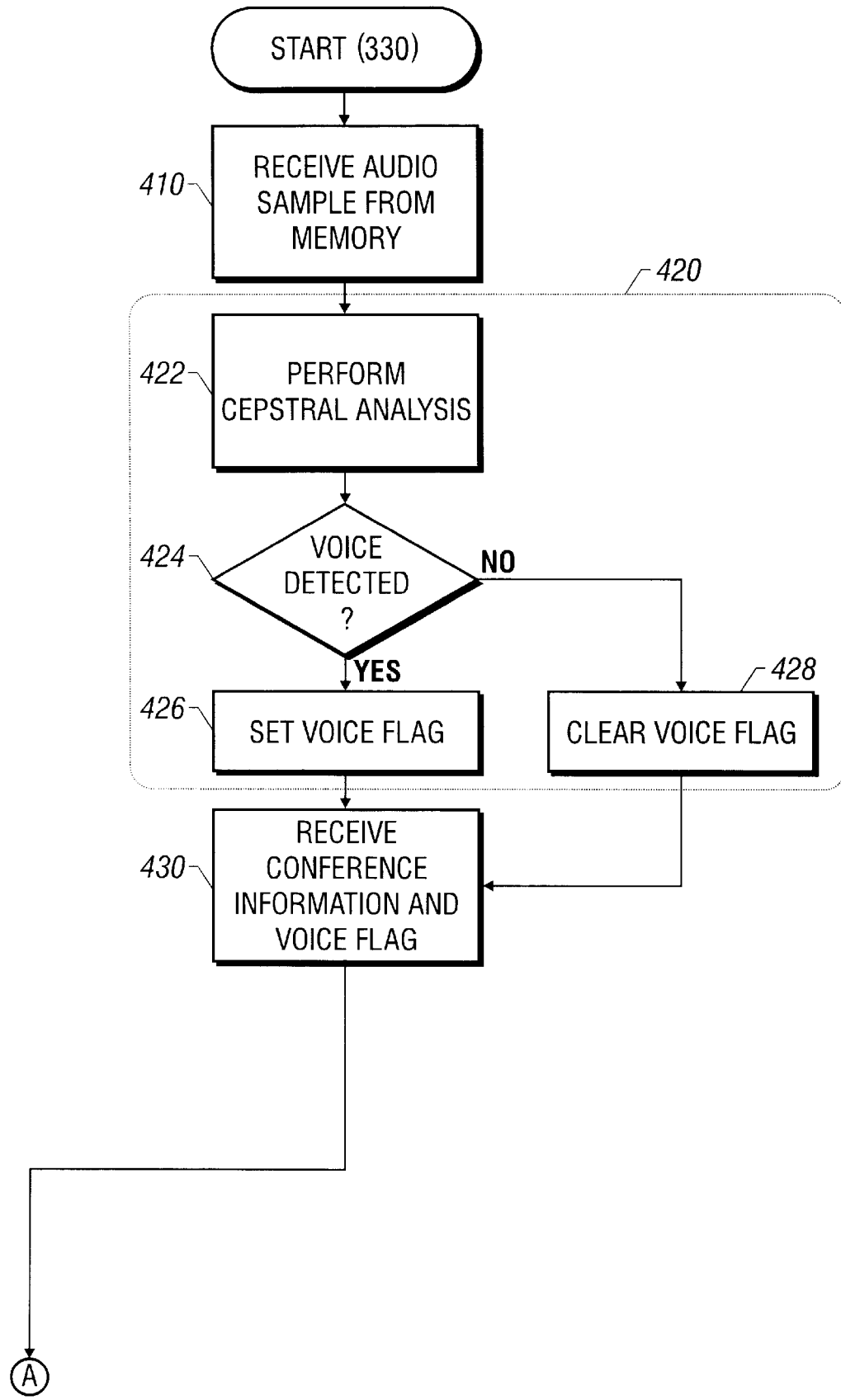
FIG. 4 shows a flow chart of one embodiment of talk/listen determination according to the invention.
Figure 4B:
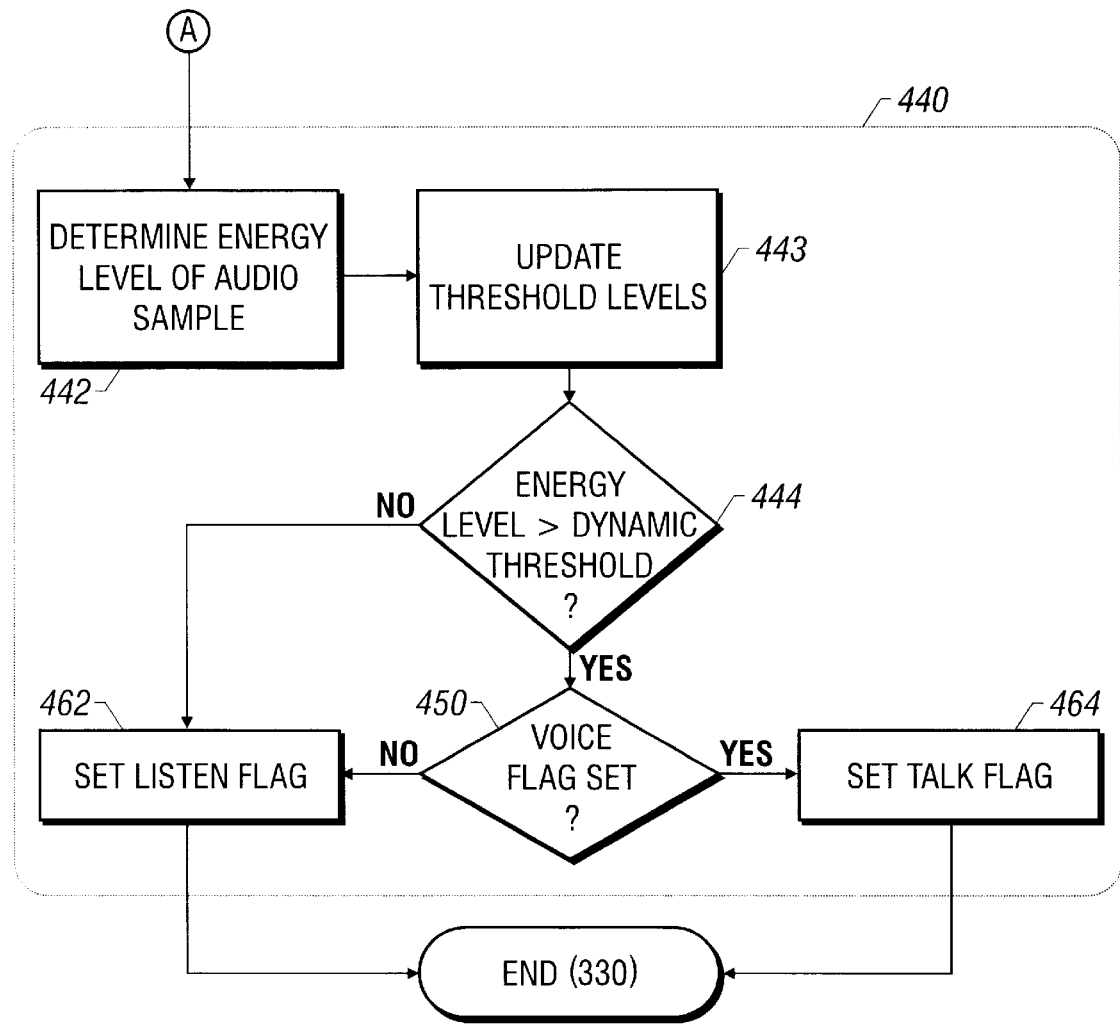

Determine talk/listen status operation 330 will now be further described with reference to FIG. 4. During receive audio sample from memory operation 410, voice detection unit 27 receives a set of decompressed audio samples (e.g., a set of 20 ms samples) from audio memory 24. Voice detection unit 27 then performs a voice analysis, indicated generally at 420, to determine and indicate if the set of audio samples includes human voiced sound. Specifically, in the embodiment of FIG. 4, voice detection unit 27 applies a cepstrum pitch determination algorithm which extracts and analyzes a cepstrum of the set of audio signals during perform cepstral analysis operation 422 (further described hereinafter with reference to FIGS. 5–8).

During voice detected decision 424, it is determined from the cepstral analysis performed at 422 whether the audio sample includes a human voiced sound. Once the type (i.e., voiced or unvoiced) of the incoming signals are determined, voice detection unit provides an indication of such to talk/listen determination unit 28. If voiced sound is detected, a voice flag is set at set voice flag operation 426. If voiced sound is not detected, the voice flag is cleared at clear voice flag operation 428. Control transitions from either of set voice flag operation 426 and clear voice flag operation 428 to receive conference information and voice flag operation 430.

During receive conference information and voice flag operation 430, talk/listen determination unit 28 receives the voice flag from voice detection unit 27 and the audio information for the set of audio signals from audio memory 24.

Talk/listen determination unit 28 next makes a determination of talk/listen status, indicated generally at 440. During determine energy level operation 442, talk/listen determination unit 28 determines the average energy level of the audio samples received from audio memory 24.

During update threshold levels operation 443, talk/listen determination unit 28 updates the dynamic threshold level used for comparison with the average energy levels of the audio samples received from audio memory 24. Various values and/or levels may be updated to maintain the dynamic threshold level which is further described hereinafter with reference to FIGS. 9 et seq.

During energy level greater than threshold decision 444, talk/listen determination unit 28 compares the energy level of the incoming audio signals with the dynamic threshold energy level. If the energy level is less than the threshold level, talk/listen determination unit 28 determines that low sound level indicates that the conference site 20 is in a listen state and sets a listen flag for the audio information received from conference site 20 at set listen flag operation 462. If the energy level is greater than or equal to the threshold level, talk/listen determination unit 28 checks if the voice flag is set at voice flag set decision 450. If the voice flag is not set, then the relatively loud but non-voiced sounds coming from conference site 20 are ignored, and the listen flag is set at set listen flag operation 462. If the voice flag is set, then the relatively loud and voiced sounds coming from conference site 20 indicate that a conference participant at conference site 20 is speaking, and the talk flag is set at set talk flag operation 464. Control then transitions to provide talk/listen determination operation 340 in FIG. 3.

Figure 5:
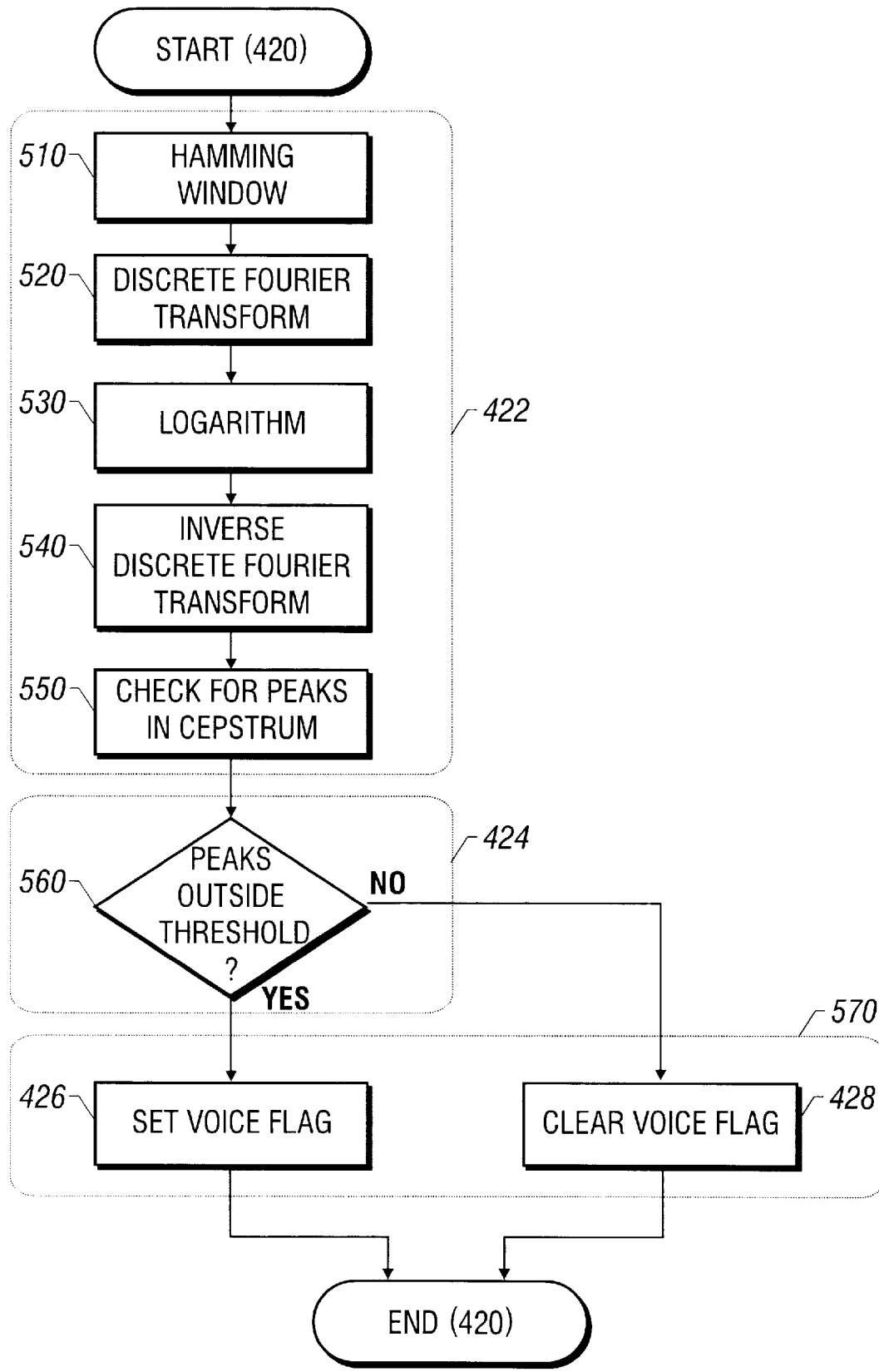
FIG. 5 shows a flow chart of one embodiment of voice detection according to the invention.
Figure 6:
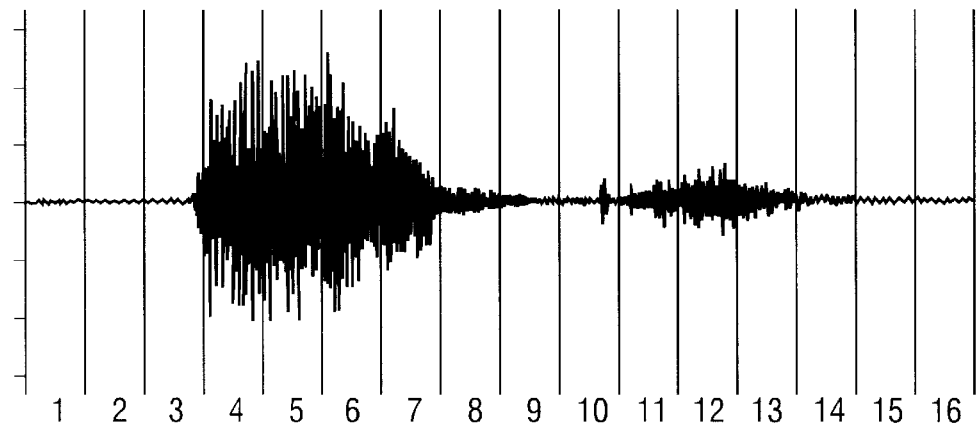
FIG. 6 shows an exemplary graph of a voiced word according to the invention.
Figure 7:
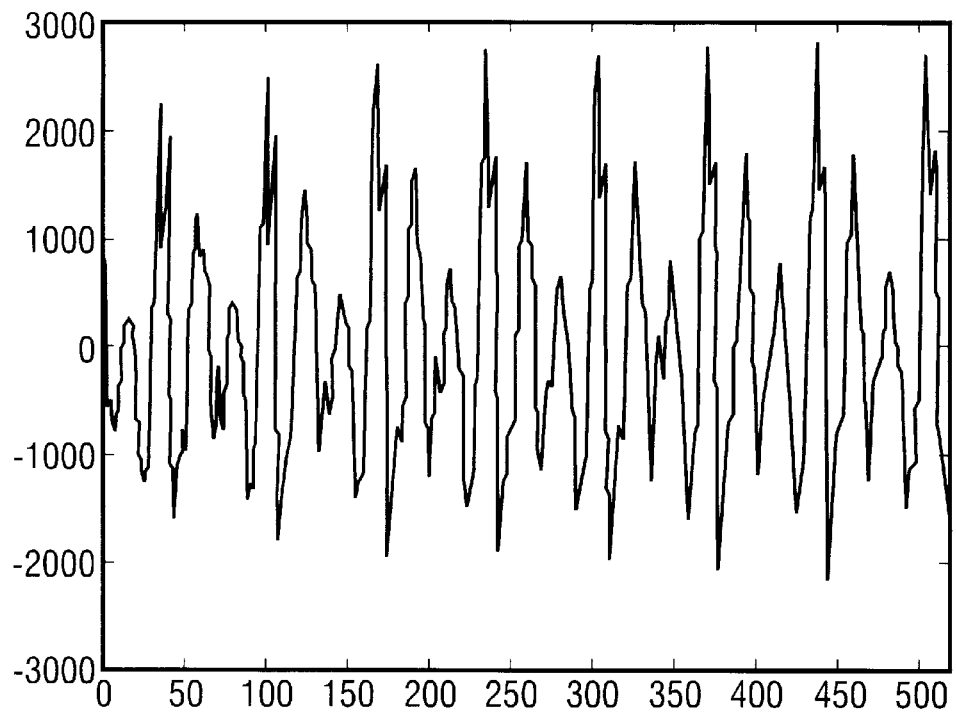
FIG. 7 shows an exemplary graph of a section of the graph of FIG. 7.

Referring to FIGS. 4–8, voice detection unit 27 identifies human voiced sounds at 420 using a method of voice analysis called cepstral analysis (sometimes called homomorphic analysis). An exemplary group of audio signals received by voice detection unit 27 is shown graphically in FIG. 6. Specifically, a female voice of "each" is shown in FIG. 6. Each of the sections numbered 1–16 is a set of 20 ms of audio samples. The number of samples in each section in FIG. 6 is determined by the sampling rate. Speech sound is produced in one of two ways. Vowels and other voiced sounds are initiated in the larynx. All unvoiced sounds are initiated by the hiss of air passing through obstructed passageways. Both of these types of sounds are modified by the shape of the auditory chamber including the throat, mouth and nose. The larynx provides a waveform at some frequency between 80 and 400 Hertz. Sections 4–7 in FIG. 6 contain the voiced sound "ea" and sections 10–14 show the unvoiced sound "ch." Sections 1–3, 8, 9, 15 and 16 are relatively silent regions with background noise. FIG. 7 is the expanded view of the set of audio samples of section 4 from FIG. 6.

Referring to FIG. 5, the group of audio signals received from audio memory 24 by voice detection unit 28 is prepared for analysis by application of any appropriate pitch determination algorithm, indicated generally at 422. For example, voice detection unit 27 derives a cepstrum of each set of audio signals at 422. Generally, a cepstrum is the inverse Fourier transform of the logarithm of the Fourier power spectrum of a signal. Specifically, at Hamming window operation 510, the set of audio samples is weighted (multiplied) by an appropriate data window such as a Hamming window to reduce sharp discontinuity at each end of the set and to produce a more accurate frequency spectrum for a subsequent short-time cepstral analysis. After Hamming window operation 510, the set of 20 ms of samples is converted from time domain to frequency domain by applying a Discrete Fourier Transform (DFT) at DFT operation 520. Control then transitions to logarithm operation 530. At logarithm operation 530, the amplitude spectrum of the processed signals is extracted by taking the logarithm of the function produced during DFT operation 520. Control then transitions to inverse DFT (IDFT) operation 540. At IDFT operation 540, the cepstrum of the set is obtained by applying the inverse discrete Fourier transform to the logarithm produced during logarithm operation 530.

Figure 8:
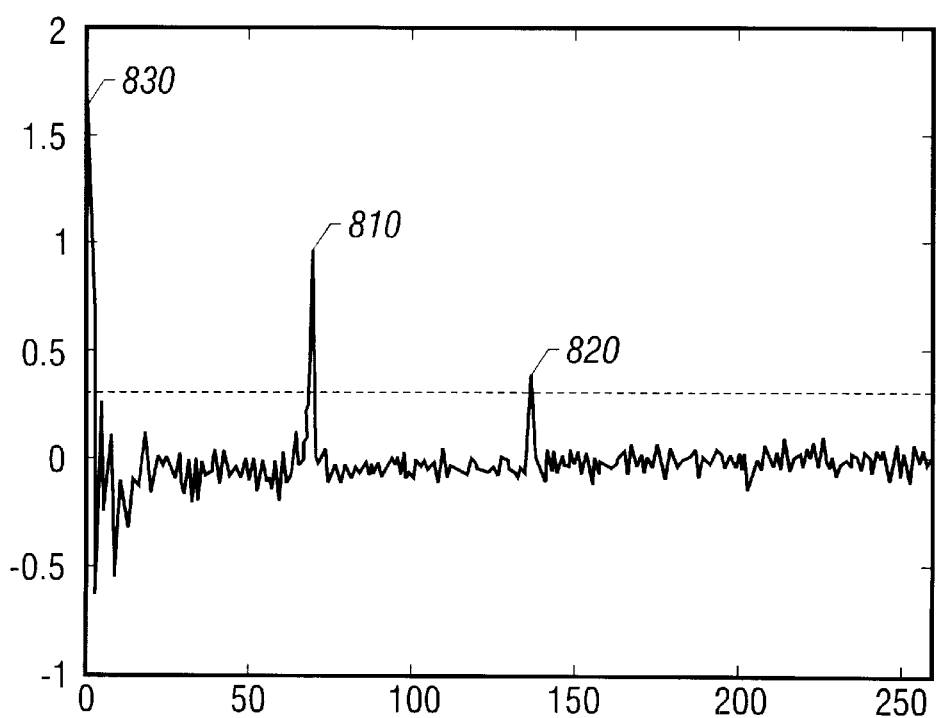
FIG. 8 shows an exemplary graph of a cepstrum of the section of FIG. 8.

The cepstrum obtained after operations 510–540 on the set of audio samples of FIG. 7 is shown in FIG. 8. At check for peaks in cepstrum operation 550, the above generated cepstrum is checked for peak values. For example, to determine if the cepstrum of the set of the audio samples contains voiced sound, an appropriate cepstral threshold is set as is known in the art, and the cepstrum is checked to determine if there are any peaks above the cepstral threshold.

Depending on the sampling rate, one can map the cepstrum of the sound samples on the x-coordinate axis as shown in FIG. 8. Peak 830 is ignored because voice pitch frequency is higher than 80 Hz, and peak 830 is in a range less than 80 Hz. If, during peaks outside threshold decision 560, peaks are determined to exist, the voice flag is set at set voice flag operation 426. For example, the presence of peaks 810 and 820 in FIG. 8 indicates that the set corresponding to the graphed cepstrum includes voiced sound. If it is determined that there are no peaks in the cepstrum during peaks outside threshold decision 560, the voice flag is cleared at clear voice flag operation 428. For example, if a set of 20 ms of samples does not include voiced sound, the graph of the cepstrum of the set will not include peaks such as peaks 810 and 820.

If the above described cepstral analysis is applied to the group of audio signals shown in FIG. 6, sections 4, 5, 6 and 7 will indicate that the group of audio signals is a voiced sound and/or includes voiced sound. Sections 1–3 and 8–16 do not include voiced sound. The sound represented in sections 11–13 is generated by air passing through obstructed passageways and is a type of hissing sound.

The above described cepstral analysis and is well known in the art. See, for example, A. Michael Noll, Cepstrum Pitch Determination, J. Acoust. Soc. Am., vol. 41, no. 2, pp. 179–195 (1967), which is incorporated herein by reference.

As described above, talk/listen determination unit 28 utilizes the voice flag from voice detection unit 27 and the audio levels of the corresponding audio samples to determine the value of talk and listen flags. The talk/listen status of a conference site 20 is determined by the energy level of the audio samples provided by conference site 20 and by the status of the voice flag provided by voice detection unit 27. Specifically, talk/listen determination unit 28 determines the energy level of a set of expanded samples (e.g., a set of 20 ms of samples) and compares the determined energy level with a dynamic threshold energy level (further described hereinafter). If the energy level of the set of audio samples is lower than the threshold level, talk/listen determination unit 28 considers the set to be background noise. If the energy level is higher than the threshold level but the voice flag is cleared, then talk/listen determination unit 28 considers the set to include loud background noise. If the energy level is higher than the threshold level and the voice flag is set, then talk/listen determination unit 28 considers the set to include voiced sound from a talking conference participant.

Because every conference site 20 has different levels of background noise which vary in time, it is desirable to use a dynamic threshold level for each conference site 20. In such an embodiment, talk/listen determination unit 28 utilizes the voice flag from voice detection unit 27 and the audio levels of the corresponding audio samples to determine a dynamic threshold level which is in turn used to determine the value of the talk/listen notification signal.

Figure 10A:
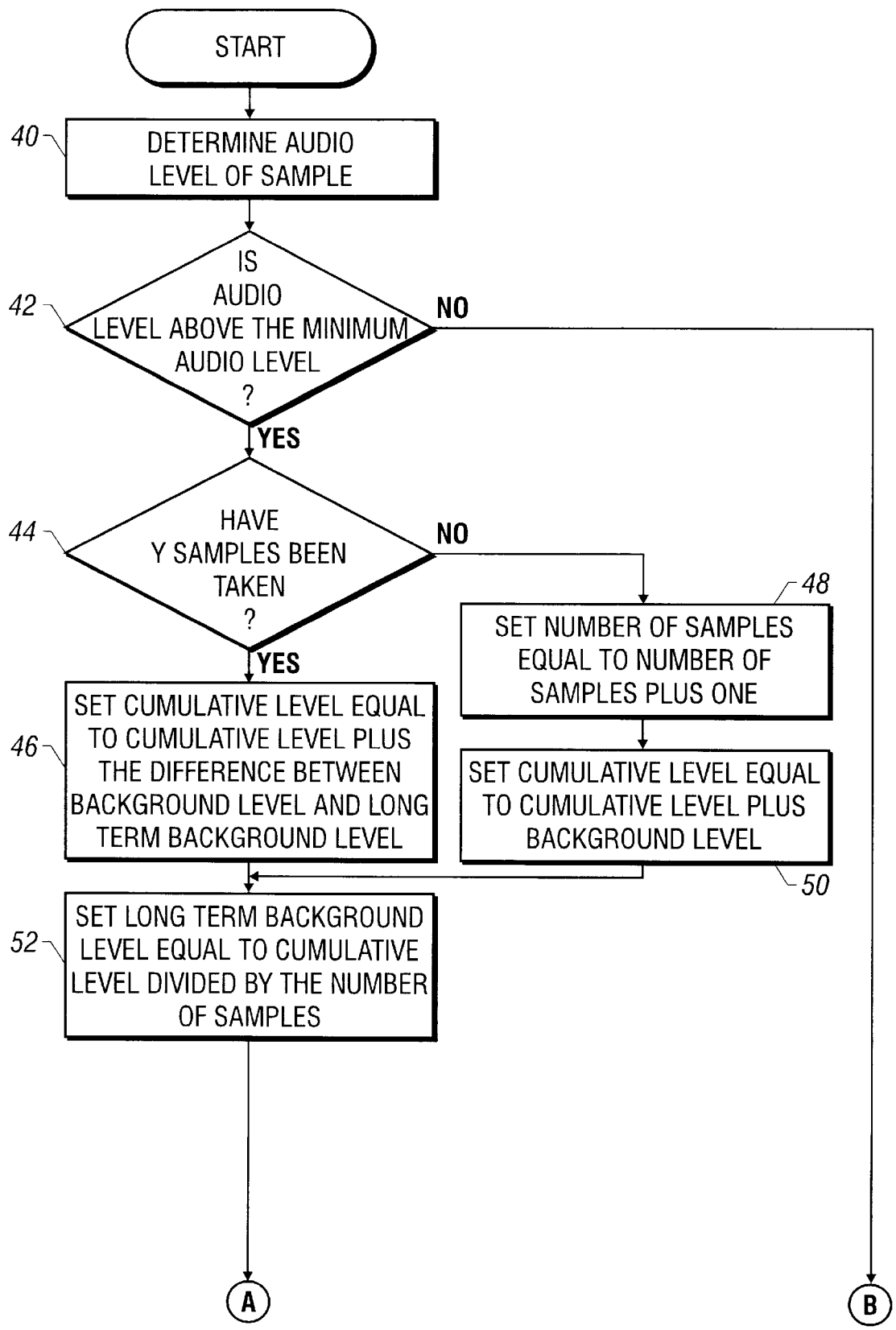
FIGS. 10A, 10B, 10C, 10D and 10E show a flow chart of one embodiment of dynamic threshold level determination and update.
Figure 10B:
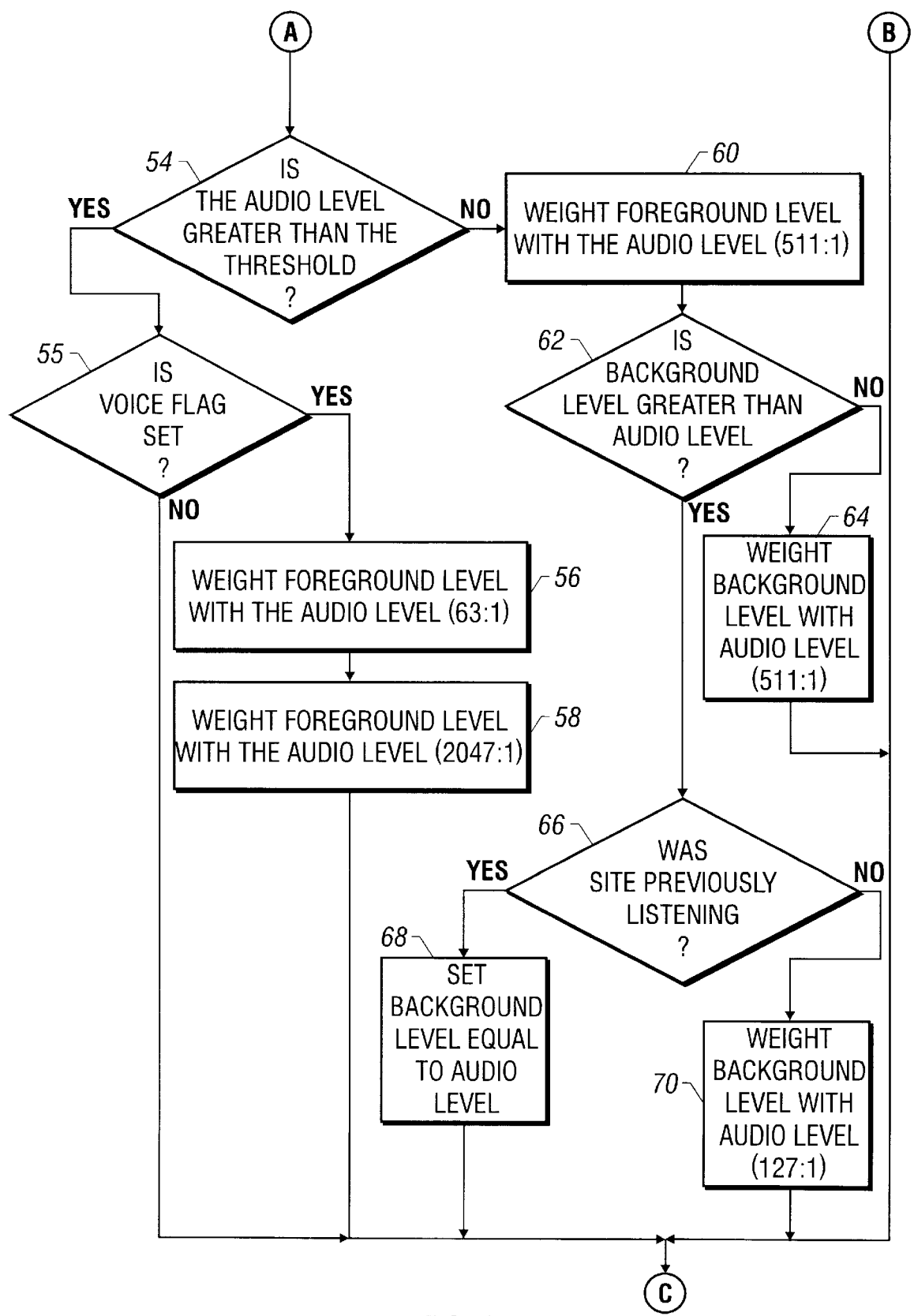
Figure 10C:
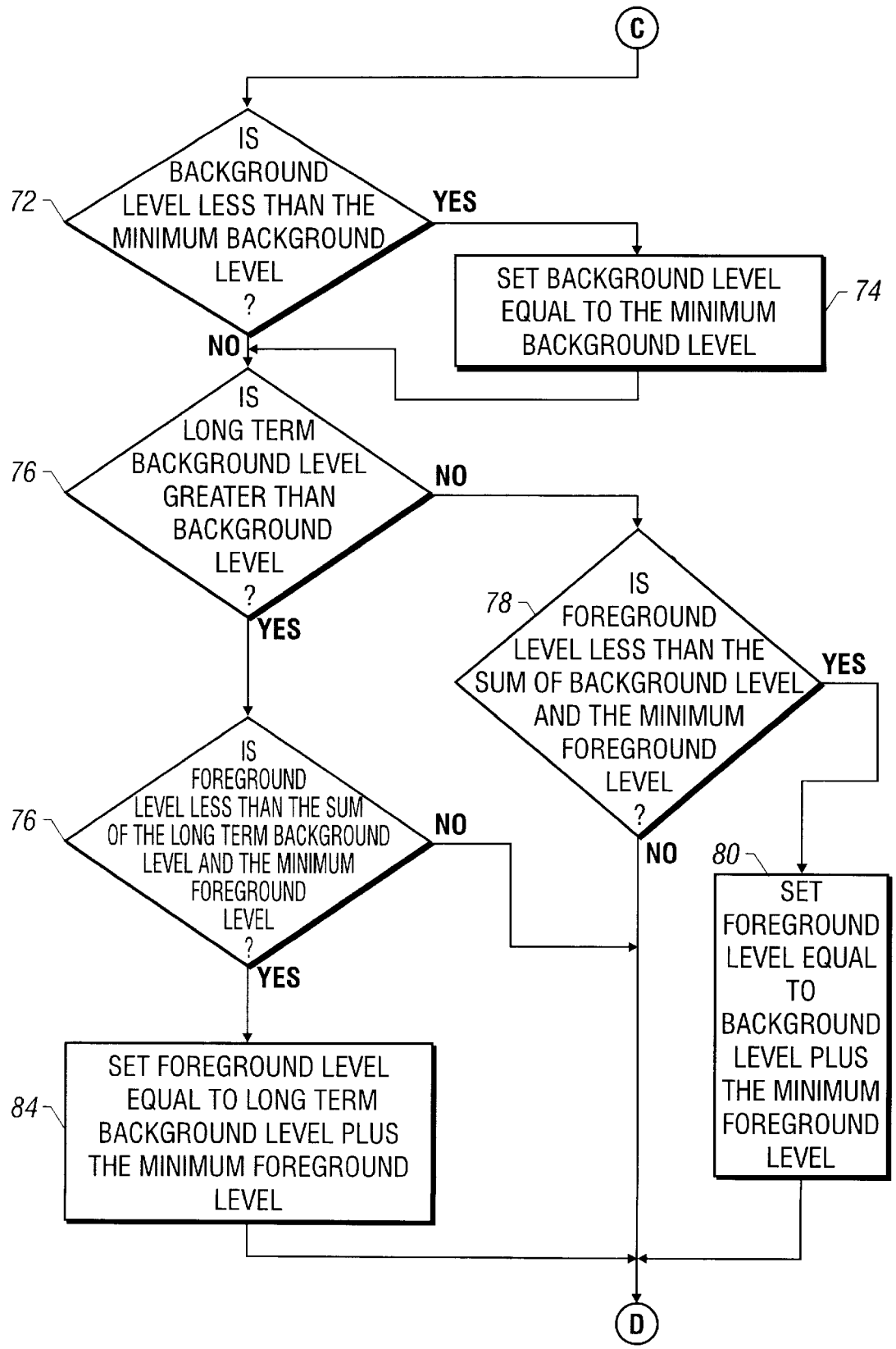
Figure 10D:
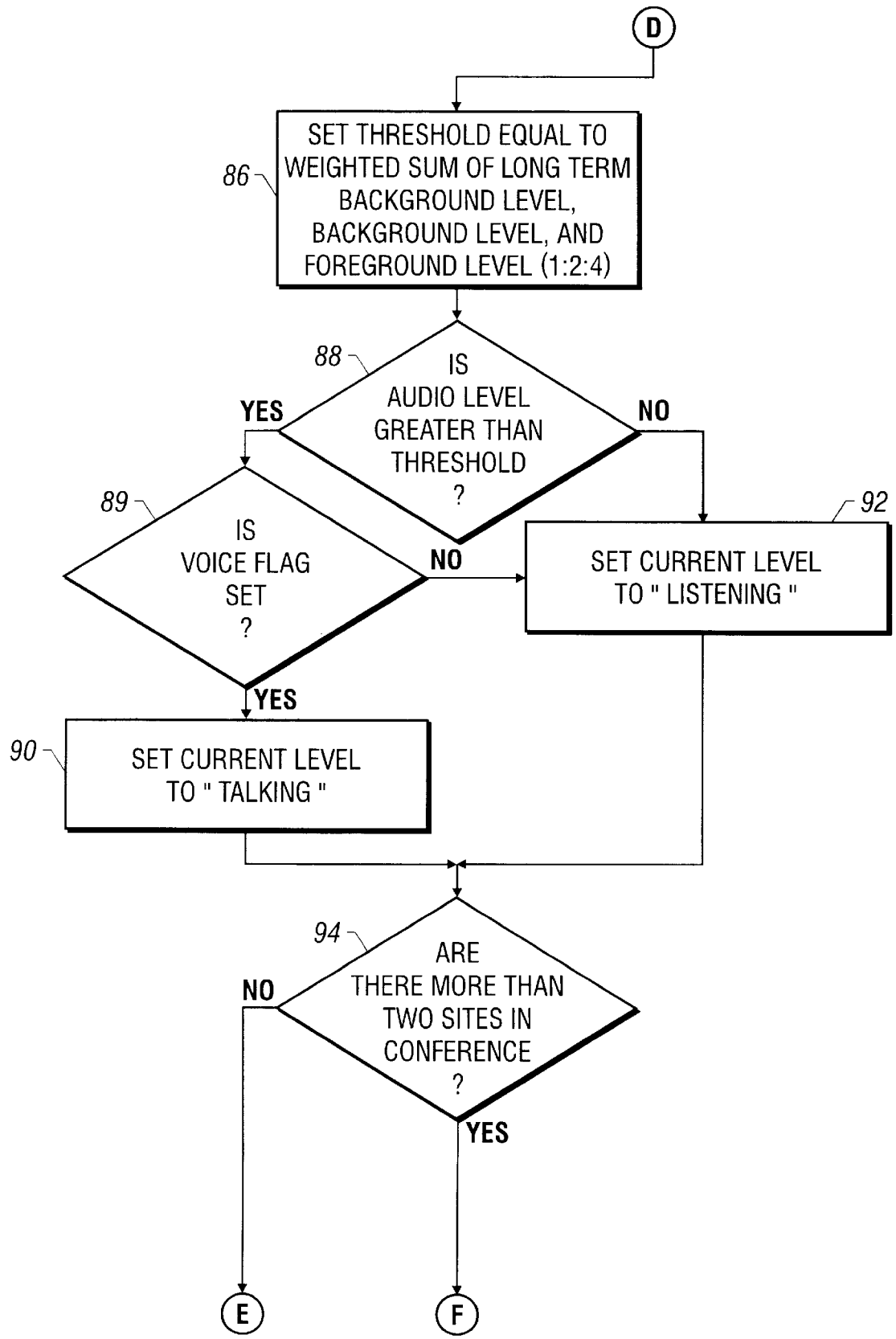
Figure 10E:
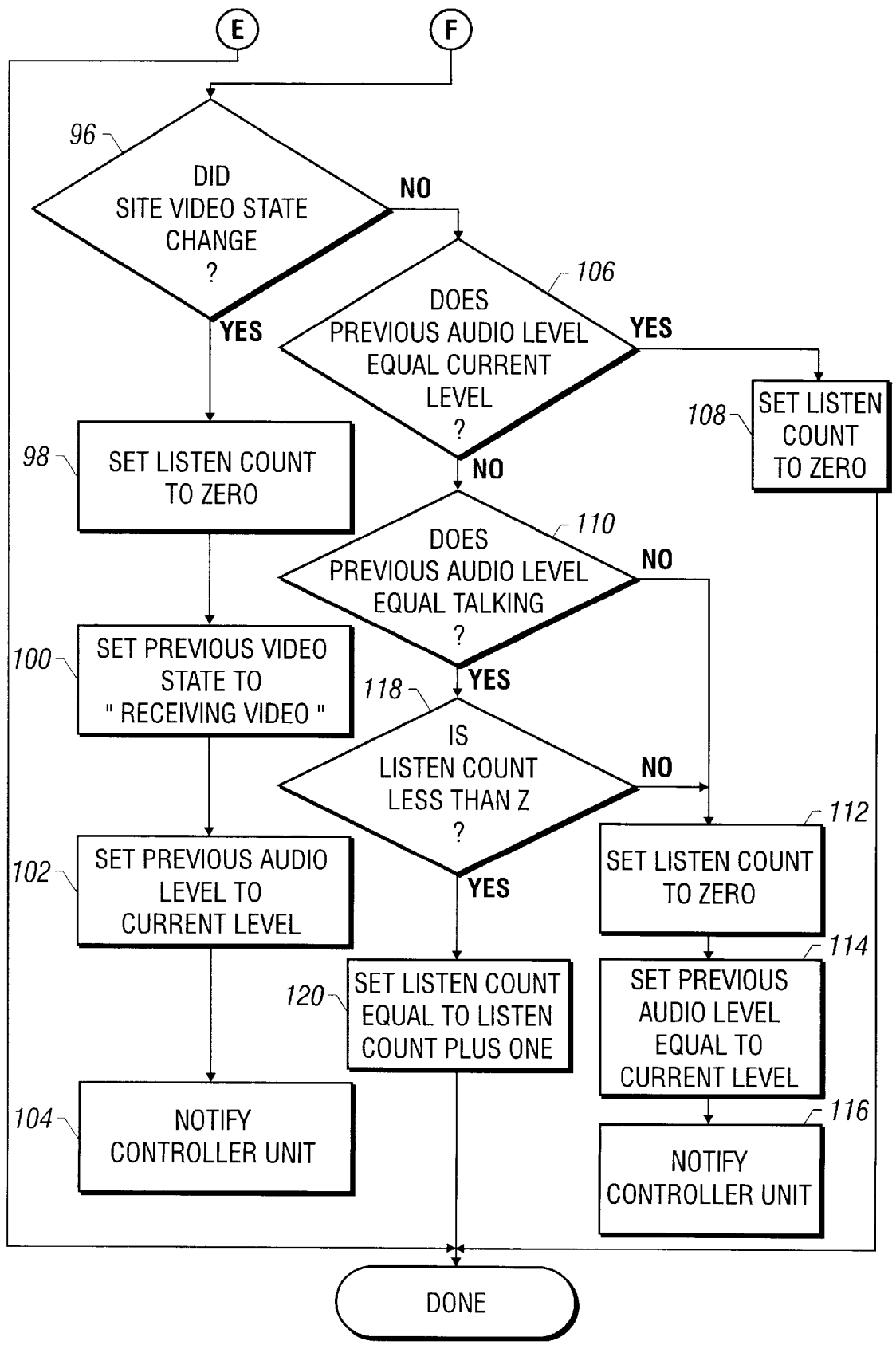

In the embodiment of FIGS. 10A, 10B and 10C (discussed below), the dynamic threshold level is updated for each audio sample, but the dynamic threshold level is updated differently depending, for example, upon whether the audio level is greater than the threshold level and upon the past talk/listen state of the conference site generating the audio level in question. The use of a continuously updated dynamic threshold level to help exclude background noise from the talk/listen determination is disclosed in co-pending U.S. patent application Ser. No. 08/546,276, filed on Oct. 20, 1995, entitled "Method for Talk/Listen Determination and Multipoint Conferencing System Using Such Method", naming Paul V. Tischler and Bill Clements as inventors, and which is incorporated herein by reference.

Figure 9:
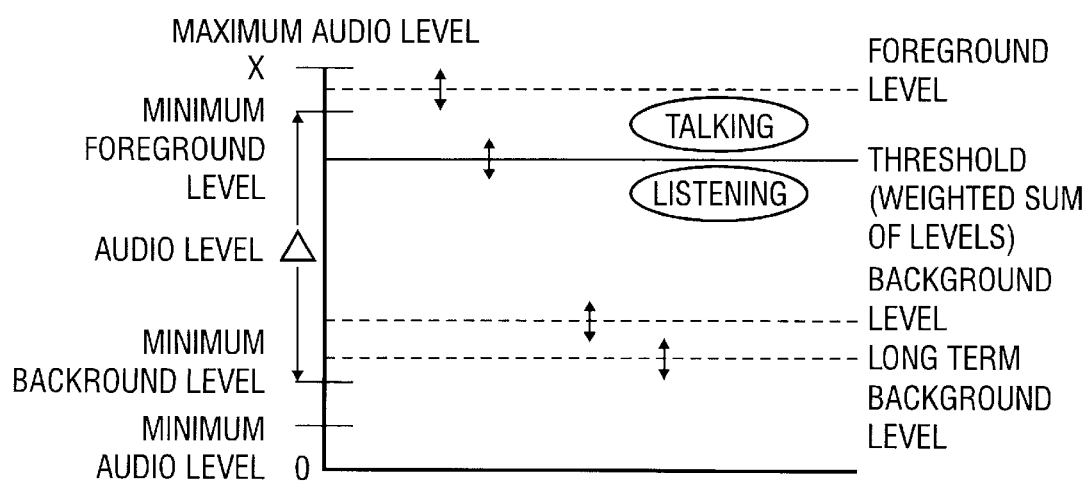
FIG. 9 shows a graph of one embodiment of a dynamic threshold and audio energy levels according to the invention.

FIG. 9 illustrates a dynamic threshold level and dynamic audio levels maintained according to the teachings of the present invention. As described above, an audio level representing the average power level of each audio sample is determined. As shown in FIG. 9, the audio level of an audio sample can vary from zero to a maximum audio level X. This range can be implemented as desired. It can be desirable to implement the range such that fixed point integer operations can be used to process the values.

From the audio level, three running audio levels are maintained: foreground level, background level, and long term background level. The foreground level represents a running average of the audio power level of the conference site while the conference site is talking. The background level represents a running average of the audio level of the conference site while the conference site is listening. Third, the long term background level represents a running average of the background level.

The dynamic threshold level is a dynamic weighted sum of the foreground level, background level and long term background level. The dynamic threshold level represents the point defining the boundary between a loud state and a quiet state. An audio level above the dynamic threshold level indicates that the conference site is loud, and an audio level below the dynamic threshold level indicates that the conference site is quiet. All four levels are dynamic and change as each audio sample is processed. As described below, by processing a loud/quiet determination and a voiced/unvoiced determination, a talk/listen determination may be made.

In the illustrated embodiment, minimum levels are defined to insure that the levels fall within reasonable values. A minimum audio level is defined as a level below which an audio level is ignored. It is assumed that an audio sample having an average power level below this level is an anomaly and should not affect the dynamic levels. A minimum background level is defined below which the background level is not allowed to drop. Third, a minimum foreground level is defined in relation to the minimum background level such that a defined delta, $\beta$, is maintained between the foreground level and the greater of the background level and the long term background level.

A technical advantage of the present invention is the determination of three dynamic levels from which a dynamic threshold level is calculated. Multipoint control unit 12 determines, for each conference site 20, an average audio power level for each audio data packet received. The audio levels are used to update and maintain three dynamic levels: background, long term background, and foreground. The dynamic threshold level is then calculated as a weighted sum of the foreground level, background level and long term background level.

An additional technical advantage of the present invention is the recording of value histories for the dynamic threshold and audio levels. This history can be accessed either locally or remotely and used to diagnose user problems with the multipoint conference system.

Referring to FIG. 10A, the audio level of each audio sample is determined during operation 40. This audio level comprises an average power level for each given audio sample. In one embodiment of the present invention, each audio sample is an expanded audio data packet representing the sound measured for approximately twenty milliseconds in the conference site. The audio level represents the average power level for the audio sample over a predetermined interval of time. In one embodiment of the present invention, the audio level is represented as a value between zero and 255 which is then multiplied by 64 to allow fixed point operations.

In decision 42, the audio level is compared against the minimum audio level. In one embodiment of the present invention, the minimum audio level has a value of two on the zero to 255 scale. If the audio level is not above the minimum audio level, the method continues at label "A" in FIG. 10B.

If the audio level is above the minimum audio level, the number of audio samples processed is checked in decision 44. If a given number of audio samples, Y, have been processed, the method continues at operation 46. Otherwise, the method continues at operation 48. In one embodiment of the present invention, the number Y is set to 8192. In this embodiment, each audio sample represents approximately twenty milliseconds, thus the 8192 samples represent approximately 2.75 minutes. In operation 46, the cumulative level is set equal to the value of the cumulative level plus the difference between the background level and the long term background level. If Y audio samples have not been taken, the number of samples is set equal to the number of samples plus one in operation 48. Then, in operation 50, the cumulative level is set equal to the cumulative level plus the background level. In this way, prior to the processing of Y audio samples, the cumulative level holds the sum of the background levels determined by processing each audio sample. After Y audio samples have been processed, the cumulative level represents a running total of the background levels. In operation 52, the long term background level is set equal to the cumulative level divided by the number of samples.

In decision 54 of FIG. 10A, the audio level is compared to the dynamic threshold level. In decision 55, the value of the voice flag is checked. If the audio level is greater than the dynamic threshold level and the voice flag is not set, the audio level includes loud noise (e.g., a door slamming) which is not used to update any levels, and the method continues at label "A" in FIG. 10B.

If the audio level is greater than the dynamic threshold level and the voice flag is set in decisions 54, 55, the foreground level is weighted with the audio level in operation 56. In the illustrated embodiment of the present invention, this weighting is at a ratio of 63:1. As used herein, weighting at a ratio of 63:1 means the following:

$$(((\text{Foreground level}) \times 63) + ((\text{audio level}) \times 1))/64.$$

In operation 58, the background level is then weighted with the audio level. In the illustrated embodiment of the present invention, the background level is weighted with the audio level at a ratio of 2047:1.

If the audio level is not greater than the dynamic threshold level in decisions 54, 55, the foreground level is weighted with the audio level at a lesser weight in operation 60. In the illustrated embodiment, the foreground level is weighted with the audio level at a ratio of 511:1. The background level, in decision 62, is then compared to the audio level. If the background level is not greater than the audio level, the background level is weighted with the audio level in operation 64. In the illustrated embodiment, the background level is weighted with the audio level at a ratio of 511:1. The method then continues at label "A" in FIG. 10B.

If the background level is greater than the audio level in decision 62, the previous state of the conference site is checked in decision 66. If the site was previously listening, then, in the illustrated embodiment, the background level is set equal to the audio level in operation 68. This is essentially a complete weighting of the background level with the audio level. If the site was not previously listening, the background level is weighted with the audio level in operation 70. This ratio is less than that in operation 64. In the illustrated embodiment, the background level is weighted with the audio level at a ratio of 127:1. After operation 70 or operation 68, the method continues at label "A" in FIG. 10B.

FIG. 10B illustrates a second part of the flow chart of the dynamic threshold level update procedure. Continuing from label "A", the background level is compared to the minimum background level in decision 72. If the background level is less than the minimum background level, the background level is set equal to the minimum background level in operation 74. This is done to insure that the background level does not drop below a minimum desired background level. In the illustrated embodiment, the minimum background level is set to six on the scale from zero to 255.

In decision 76, the long term background level is compared to the background level. If the long term background level is not greater than the background level, the foreground level is then compared to the sum of the background level and the minimum foreground level in decision 78. The minimum foreground level defines a desired delta between the foreground level and the higher of the background level and the long term background level. In one embodiment of the present invention, the minimum foreground level is set to 52 on the scale from zero to 255.

If the foreground level is less than the sum of the long term background level and the minimum foreground level, the foreground level is set equal to the background level plus the minimum foreground level in operation 80. This insures that the desired delta defined by the minimum foreground level is established between the foreground level and the background level. As mentioned above, the background level is used rather than the long term background level because the background level is higher. If, in decision 78, the foreground level is not less than the sum of the long term background level and the minimum foreground level, then no adjustment is necessary.

In decision 76, if the long term background level is greater than the background level, the foreground level is then compared to the long term background level plus the minimum foreground level in decision 82. If the foreground level is less than that sum, in operation 84, the foreground level is set equal to the long term background level plus the minimum foreground level. Again, this insures a desired delta between the foreground level and the long term background level. In this case, the long term background level is higher than the background level.

After operation 78, 80, 82, or 84, respectively, the dynamic threshold level is set equal to a weighted sum of the long term background level, background level and foreground level in operation 86. In the illustrated embodiment, the dynamic threshold level is weighted at the ratio 1:2:4 with respect to the long term background level, the background level, and the foreground level. Thus, the dynamic threshold level equals the following:

$$(((\text{Long term background}) \times 1) + (\text{background} \times 2) + (\text{foreground} \times 1))/7.$$

As should be understood, this threshold level is dynamic and changes as each audio sample is processed. The background level, long term background level and foreground level also vary as the audio level of each sample is processed. As shown in the embodiment of FIG. 9, these levels vary within the range of the audio level, but can be fixed to some extent by defined minimum levels.

According to the teachings of the present invention, the dynamic threshold level is used to determine whether a conference site is loud or quiet in preparation for determining whether the site is in a talking or a listening state. As used herein, loud and quiet refer to sound levels relative to the dynamically determined threshold level and are not meant to refer to absolute sound levels. For example, quiet refers to a sound level below the dynamic threshold level and thus refers to a sound level that is relatively quiet. Quiet does not necessarily refer to the absence of sound. The loud/quiet determination (e.g., comparison of current level with threshold level) is used in combination with a voiced/ unvoiced determination to provide a more accurate talk/ listen determination.

In decision 88, the audio level is compared to the dynamic threshold level. In decision 89, the value of the voice flag is checked. If the audio level is not greater than the dynamic threshold level, the current level is set to "listen" in operation 92. If the audio level is greater than the dynamic threshold level and the voice flag is not set, the current level is set to "listen" in operation 92. If the audio level is greater than the dynamic threshold level and the voice flag is set, then the current level is set to "talk" in operation 90. In one embodiment of the present invention, talking is represented by "0xffff," and listening is represented by "0x0000." The method then continues at label "B" of FIG. 10C.

FIG. 10C illustrates a third part of the flow chart of the dynamic threshold level update procedure. Continuing from label "B", the number of conference sites is checked in decision 94. If there are not more than two sites presently in the conference, the method has completed processing of the current audio sample.

If there are more than two sites in the conference, the video state of the associated conference site is analyzed in decision 96. If the video state of the site has changed, the listen count is set to zero in operation 98. A change of video state is a change from only receiving video to receiving and transmitting video or vice versa. In operation 100, the previous video state is set to "receiving video". Then, in operation 102, the previous audio level is set to equal the current level. (It should be noted that the current level was set in either operation 90 or operation 92 of FIG. 10B.) The controller unit is then notified in operation 104 as to the current level.

If the site video state did not change, then the previous audio level is compared to the current level in decision 106. If the previous audio level is equal to the current level, the listen count is set equal to zero in operation 108. The previous audio level and current level are equal when the state of the conference site, talk or listen, has not changed due to the current audio sample.

In decision 110, the previous audio level is checked to determine whether or not it is talking. If the previous audio level is not talking (i.e. listening), the listen count is set to zero in operation 112. Then, in operation 114, the previous audio level is set equal to the current level (which is talking). The controller is then notified of the current level in operation 116.

If, in decision 110, the previous audio level was talking, the listen count is compared to a number Z in decision 118. Z can be set to a value as desired to provide a silence delay for speaker pauses. In one embodiment of the present invention, Z is set to the number 6. If the listen count is not less than Z, then the listen count is set to zero in operation 112, the previous audio level is set equal to the current level (which is listening) in operation 114, and the controller unit is notified of the current level in operation 116. If the listen count is less than Z, the listen count is incremented by one in operation 120.

It should be understood that the series of operations from 106 to 120 operate to make no notification to the control unit if the previous level and current level are the same. If the previous level and the current level are different, separate processes are implemented depending upon whether the previous level was talking or listening. If the previous level was listening, the listen count is immediately set to zero, the previous level is set to equal the current level (which is talking), and the controller unit is notified. However, if the previous level was talking, a silence delay is implemented by decision 118. When the previous level is talking, operations 112, 114 and 116 are executed only if the listen count is greater than Z. The listen count can grow greater than Z only when the previous level is talking and a number of audio samples equal to Z have indicated a current level of listening. Thus, the controller unit is notified of a change from talking to listening only after Z audio samples have indicated such a change.

According to the teachings of the present invention, the audio level of audio samples received from the conference site are used to determine and maintain a dynamic threshold level. This dynamic threshold level is then used to identify the conference site as loud or quiet. The loud/quiet determination can then be processed with a voiced/unvoiced determination to provide a talk/listen determination to a control unit or other appropriate switching device to implement voice activated switching in a multipoint conference.

A technical advantage of the present invention is allowing a multipoint control unit to accurately determine whether a site is talking or listening independent of the conference equipment or audio compression algorithm used. Thus, the present invention makes the multipoint control unit's determination of the talk/listen state independent of the manufacturer of the conference equipment.

Another technical advantage of the present invention is the ability of a multipoint control unit to accurately determine whether a site is talking or listening despite differences in talker volume, ambient noise, attached site conference equipment or audio compression algorithms. A further advantage of the present invention is the prevention of accidental switching due to loud, non-voiced sound. Correct talk/listen determination enables the multipoint control unit to perform activated video switching cleanly and accurately.

The technical advantages of the present invention apply to any system that operates to determine whether an audio data stream represents a talking state. For example, phone mail systems often determine whether a user is speaking when recording a message. Thus, in some such systems, the listen state described above would refer to a not-talking state not necessarily having a "listener." The embodiments described herein are not intended and should not be construed to limit the application of the present invention.

The above description is intended to describe at least one embodiment of the invention. The above description is not intended to define the scope of the invention. Rather, the scope of the invention is defined in the claims below. Thus, other embodiments of the invention include various modifications, additions, and/or improvements to the above description.

For example, in the above description, each of conference sites 20, conference equipment 18, conference units 14 are identical, and the discussion of one applies to the others. Other embodiments include differences between conference sites 20, conference equipment 18 and conference units 14 in accordance with the invention. For example, each conference equipment 18 may include any number and any type of video cameras, microphones, video monitors and speakers. Furthermore, some or all of conference equipment 18 may include any number and any type of information processing terminals.

Also, although the above described embodiment uses cepstrum analysis to distinguish between voiced and unvoiced sounds, other techniques are used in other embodiments. For example, autocorrelation, harmonic peak-based methods or other maximum likelihood methods may be used. Furthermore, although a Hamming window is used in the above described cepstral analysis embodiment(s), other appropriate data windowing techniques may be used. Such data windowing techniques are well known in the art.

The protocols for transferring conference information and flags between individual units of multipoint conference system 10 are well known in the art and are not presented here to avoid obfuscation of the invention. Also, as used herein, setting the talk flag and setting the listen flag are exemplary of providing an indication or notification of a talk/no-talk status. Such indication or notification may include setting a single talk/listen flag to either of two values indicating talk and listen. Alternatively, such indication or notification may include setting counter values in a counter circuit for measuring time between switching from listen to talk to allow for speaker pauses, etc. Such indication or notification may include a status signal provided between units. Similar alternatives are appropriate for other flags in the above described embodiment(s). Furthermore, controller unit 16 may resolve talk contention in any of a variety of appropriate and well known methods. For example, controller unit 16 can compare the audio levels of all conference sites that are determined to be "talking" by their corresponding conference units 14.

Those skilled in the art will recognize that circuit elements in circuit diagrams and boundaries between logic blocks are merely illustrative and that alternative embodiments may merge logic blocks or circuit elements or impose an alternate decomposition of functionality upon various logic blocks or circuit elements. For example, although voice detection unit 27 is characterized as being a separate logic block coupled between talk/listen determination unit 28 and audio memory 24, voice detection unit 27 may be represented as part of an audio processing unit including audio memory 24, audio processor 26 and voice detection unit 27. Alternatively, voice detection unit 27 may be included within talk/listen determination unit 28. Alternatively, voice detection unit 27 may be coupled to multipoint control unit 12 instead of coupled within multipoint control unit 12. Many embodiments of voice detection unit 27 may be implemented in accordance with the invention as long as the voice detection is performed.

Similarly, the operations of the above description are for illustration only. Operations may be combined or the functionality of the operations may be distributed in additional operations in accordance with the invention. In one embodiment of the present invention, the operations are implemented via software source code. Other embodiments may use other different types of software or may use non-software based control methods.

Moreover, alternative embodiments may combine multiple instances of a particular component. For example, in the above described embodiment, a conference unit is provided for each conference site. In other embodiments, a single conference unit may receive audio, video and data information directly from multiple conference sites or via another multipoint control unit 12. Such a single conference unit may process the information in a multiprocessing and/or multitasking fashion.

Although an attempt has been made to outline a few exemplary variations, other variations are within the scope of invention as defined in the claims below.

What is claimed is:

1. A method for determining a talk/listen state using voice detection, comprising:

receiving an audio sample representing sound measured during a sample time interval;

detecting whether the audio sample includes voiced sound;

deriving an audio level from the audio sample, the audio level representing an average power level of the audio sample;

comparing the audio level to a threshold level;

determining the talk/listen state depending on a relation of the audio level to the threshold level and depending on whether the audio sample includes voiced sound.

2. A method as recited in claim 1 wherein the determining the talk/listen state comprises:

determining the talk/listen state to be a listening state if audio level is below the threshold level;

determining the talk/listen state to be the listening state if the audio sample does not include voiced sound; and determining the talk/listen state to be a talking state if the audio level is above the threshold level and the audio sample includes voiced sound.

3. A method as recited in claim 2, wherein each of the determining the talk/listen state to be a listening state includes setting a talk/listen indication to a first value indicating listen; and the determining the talk/listen state to be a talking state includes setting the talk/listen indication to a second value indicating talk.

4. A method as recited in claim 1 wherein the detecting whether the audio sample includes voiced sound comprises performing a cepstral analysis on the audio sample.

5. A method as recited in claim 4 wherein the performing the cepstral analysis on the audio sample comprises:

taking the Fourier transform of the audio sample to generate a first intermediate result;

taking the logarithm of the first intermediate result to generate a second intermediate result; and taking the inverse Fourier transform of the second intermediate result to generate a cepstrum of the audio signal.

6. A method as recited in claim 5 wherein the performing the cepstral analysis on the audio sample further comprises:

determining whether the cepstrum includes peak values greater than a cepstrum threshold value.

7. A method as recited in claim 4 wherein the performing the cepstral analysis on the audio sample comprises:

multiplying the audio sample by a data window to generate a first intermediate result;

taking the Fourier transform of the first intermediate result to generate a second intermediate result;

taking the logarithm of the second intermediate result to generate a third intermediate result; and taking the inverse Fourier transform of the third intermediate result to generate a cepstrum of the audio signal.

8. A method as recited in claim 7 wherein the data window is a Hamming window.

9. A method as recited in claim 1 the method further comprising:

setting a voice indication to a first value if the audio sample includes voiced sound; and setting the voice indication to a second value if the audio sample does not include voiced sound.

10. A method as recited in claim 1 wherein the threshold level is a dynamic threshold level; and the method further includes setting the threshold level by processing the audio level to set and maintain a dynamic level and using the dynamic level to determine a value for the threshold level;

repeating the steps of the method for each audio sample in a sequential stream of received audio samples such that the threshold level is dynamically maintained and used to determine the talk/listen state.

11. A method as recited in claim 10 wherein the setting the threshold level comprises processing the audio level to set and maintain a background level and using the background level to determine the value for the threshold level.

12. A method as recited in claim 11 wherein the processing the audio level to set and maintain the background level comprises:
   weighting the background level with the audio level at a first weight if the audio level is greater than the threshold level and the audio sample includes voiced sound; and
   weighting the background level with the audio level at a second weight if the audio level is less than the threshold level.

13. A method as recited in claim 12 wherein
   the first weight is 63:1; and
   the second weight is 511:1.

14. A method as recited in claim 10 wherein the setting the threshold level comprises processing the audio level to set and maintain a foreground level and using the foreground level to determine the value for the threshold level.

15. A method as recited in claim 14 wherein the processing the audio level to set and maintain the foreground level comprises:
   weighting the foreground level with the audio level at a first weight if the audio level is greater than the threshold level and the audio sample includes voiced sound; and
   weighting the foreground level with the audio level at a second weight if the audio level is less than the threshold level.

16. A method as recited in claim 15 wherein
   the first weight is 2047:1; and
   the second weight is 127:1.

17. A method as recited in claim 14, wherein the setting the threshold level further comprises processing the audio level to set and maintain a background level and using the background level and the foreground level to determine the value for the threshold level.

18. A method as recited in claim 17, wherein the setting the threshold level further comprises processing the audio level to set and maintain a long term background level and using the background level, the foreground level and the long term background level to determine a value for the dynamic threshold level.

19. A method as recited in claim 18, wherein the setting the threshold level comprises setting the threshold level as a weighted sum of the background level, the foreground level and the long term background level.

20. A method as recited in claim 19, wherein the threshold level comprises a weighted sum having a ratio of 1:2:4 of the long term background level, the background level and the foreground level.

21. A method as recited in claim 10, wherein the setting the threshold level comprises processing the audio level to set and maintain a long term background level and using the long term background level to determine the value for the threshold level.

22. A method as recited in claim 10, the method further comprising:
   setting a long term background level;
   setting a foreground level by weighting the foreground level with the audio level;
   setting a background level by weighting the background level with the audio level;
   setting the threshold level equal to a weighted sum of the long term background level, the foreground level and the background level.

23. A method as recited in claim 1 wherein
   the method is implemented in a multipoint control unit for a multipoint conference; and
   the receiving an audio sample comprises receiving an audio sample from a conference site.

24. A method as recited in claim 1 wherein the receiving an audio sample comprises receiving an audio data packet that is part of a data stream including audio and video information, the audio data packet representing sound measured over a time interval.

25. An apparatus comprising:
   a voice detection unit detecting whether an audio signal includes voiced sound responsive to receiving the audio signal;
   a talk/listen determination unit coupled to the voice detection unit, the talk/listen determination unit deriving an average audio power level of the audio signal and deriving a dynamic threshold level based on the average audio power level and past average audio power levels responsive to receiving the audio signal, the talk/listen determination unit determining a talk/listen state depending on a comparison of the average audio power level and the dynamic threshold level and on whether the voice detection unit detects voiced sound.

26. An apparatus as recited in claim 25 wherein
   the talk/listen determination unit is operable to update the dynamic threshold level as a first weighted average of the average audio power level and the past average audio power levels when the average audio power level is below the dynamic threshold level; and
   the talk/listen determination unit is operable to update the dynamic threshold level as a second weighted average of the average audio power level and the past average audio power levels when the average audio power level is above the dynamic threshold and the audio signal includes voiced sound.

27. An apparatus as recited in claim 26 wherein
   the talk/listen state indicates talking when the average audio power level is greater than the dynamic threshold level and the audio signal includes voiced sound.

28. An apparatus as recited in claim 27 wherein
   the talk/listen state indicates listening when the average audio power level is less than the dynamic threshold level; and
   the talk/listen state indicates listening when the average audio power level is greater than the dynamic threshold level and the audio signal includes voiced sound.

29. An apparatus as recited in claim 25, the apparatus further comprising:
   a first interface unit for receiving an audio signal representing sound measured during a sample time interval;
   an audio memory coupled to receive the audio signal from the first interface unit, the audio memory storing the audio signal responsive to receiving the audio signal, the audio memory coupled to provide the audio signal to the voice detection unit; and
   a second interface unit coupled to receive the talk/listen state from the talk/listen determination unit.

30. An apparatus as recited in claim 25 wherein the voice detection unit and the talk/listen determination unit are comprised within a conference unit for receiving and transmitting audio and video information from and to a conference site.

31. An apparatus as recited in claim 25, the apparatus further comprising:

a controller unit; and a conference unit, the conference unit including the voice detection unit; and the talk/listen determination unit, at least one other conference unit, each of the at least one other conference unit including at least a corresponding voice detection unit and a corresponding talk/listen determination unit.

32. An apparatus as recited in claim 31 wherein each of the conference units transmits and receives audio and video information between a corresponding one of a plurality of conference sites and the controller unit within a multipoint conference system using human voice detection and the dynamic threshold level to minimize switching based on unvoiced sound.

33. An apparatus as recited in claim 32, the apparatus further comprising:

a multipoint control unit, the multipoint control unit including the conference units, each of the conference units being coupled to receive and process each audio sample in a sequential stream of audio samples received from a corresponding conference site, each of the conference units being coupled to provide a respective one of a plurality of corresponding notification signals indicating a talk/listen state of a corresponding conference site; and the controller unit, the controller unit being coupled to the conference units to receive each of the plurality of notification signals, the control unit using the notification signals to select a primary transmission site from among conference sites corresponding to the conference units.

34. An apparatus as recited in claim 33 wherein the multipoint control unit is coupled within a multipoint conference system, the multipoint conference system comprising:

a plurality of sets of conference equipment, each set of conference equipment for being located at a conference site to transmit a sequential stream of audio samples, each audio sample from a corresponding conference site representing sound measured from the corresponding conference site for a sampled interval of time;

the multipoint control unit coupled to the plurality of sets of conference equipment via respective conference units, the multipoint control unit receiving each sequential stream of audio samples, the multipoint conference system operable to determine whether each audio sample received from each conference equipment includes voiced sound to determine a talk/listen state of each conference site and to control voice-activated switching of video between the conference sites using the determined talk/listen states of the conference sites.

35. An apparatus as recited in claim 34 wherein the multipoint conference system is further operable to set and maintain a dynamic level associated with each site and to set a dynamic threshold level associated with each conference site by processing each dynamic level and audio sample in the sequential stream received from each set of equipment; and compare an audio level of each audio sample to the dynamic threshold level to determine the talk/listen state of each conference site.

36. A voice activated switching device for selecting a primary transmission site from among a plurality of transmission devices, the voice activated switching device comprising:

means for determining whether audio signals received from each of the transmission devices include voiced or unvoiced sound;

means for repeatedly determining a dynamic threshold level for each of the transmission devices;

means for comparing each of the audio signals received from each of the transmission devices to a corresponding dynamic threshold level;

means for determining a talk/listen state for each transmission device based on whether each audio signal includes voiced sound and on whether a power level of each audio signal is greater than the dynamic threshold level.

37. The voice activated switching device as recited in claim 36, wherein the means for determining a talk/listen state for each transmission device comprises:

means for indicating a listen state for each transmission device if the power level of each audio signal is below the dynamic threshold level;

means for indicating a listen state for each transmission device if the corresponding audio sample does not include voiced sound; and means for indicating a talk state for each transmission device if the power level of each audio signal is above the corresponding dynamic threshold level and each audio sample includes voiced sound.

* * * * *